US006648225B2

(12) United States Patent
Harris et al.

(10) Patent No.: US 6,648,225 B2
(45) Date of Patent: *Nov. 18, 2003

(54) OPTICAL READER WITH COMBINED HOUSING AND LIGHT PIPE

(75) Inventors: Richard Hunter Harris, Raleigh, NC (US); Robert William Kruppa, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 09/803,603

(22) Filed: Mar. 9, 2001

(65) Prior Publication Data

US 2001/0013549 A1 Aug. 16, 2001

Related U.S. Application Data

(63) Continuation of application No. 09/237,143, filed on Jan. 25, 1999, now Pat. No. 6,247,645.

(51) Int. Cl.[7] .................................................. G06K 7/10
(52) U.S. Cl. ....................... 235/454; 235/473; 250/234; 250/239
(58) Field of Search ................................ 235/454, 473, 235/459, 462.43, 462.49, 472.03, 475; 250/216, 234, 239, 555; 359/212, 208

(56) References Cited

U.S. PATENT DOCUMENTS

| 3,584,779 | A |   | 6/1971  | Kessler ........................ 235/250 |
|-----------|---|---|---------|------------------------------------------|
| 3,610,891 | A |   | 10/1971 | Raciazek ..................... 235/250   |
| 3,691,372 | A |   | 9/1972  | Sangster ...................... 250/235  |
| 3,726,998 | A |   | 4/1973  | Szpak et al. ................. 178/346   |
| 3,735,350 | A |   | 5/1973  | Lemelson .................... 340/235    |
| 3,976,973 | A |   | 8/1976  | Martin et al. ............... 235/61.11  |
| 4,005,286 | A | * | 1/1977  | Faulkner ..................... 250/216   |
| 4,196,846 | A |   | 4/1980  | Kao et al. .................... 235/475  |
| 4,288,690 | A | * | 9/1981  | Sanner ........................ 250/216  |
| 4,396,902 | A | * | 8/1983  | Warthan et al.                           |
| 4,495,412 | A |   | 1/1985  | Thoone et al. ............... 250/227    |
| 4,591,714 | A | * | 5/1986  | Goto et al. .................. 250/585   |
| 4,591,715 | A | * | 5/1986  | Goto .......................... 250/585  |
| 4,748,318 | A |   | 5/1988  | Bearden et al. ............. 235/472     |
| 4,831,275 | A |   | 5/1989  | Drucker ...................... 250/235   |
| 5,025,483 | A | * | 6/1991  | Dinan et al.                             |
| 5,115,325 | A |   | 5/1992  | Kallin et al. ................. 358/406  |
| 5,345,090 | A |   | 9/1994  | Hludzinski ................... 250/235   |
| 5,393,966 | A | * | 2/1995  | Gatto et al.                             |
| 5,420,406 | A | * | 5/1995  | Izawa et al.                             |
| 5,489,773 | A |   | 2/1996  | Kumar ........................ 235/462   |
| 5,572,007 | A |   | 11/1996 | Aragon et al. .............. 359/827     |
| 5,586,212 | A |   | 12/1996 | McConica et al. .......... 385/146       |
| 5,912,449 | A |   | 6/1999  | Inoue et al. ................. 235/462   |
| 6,033,090 | A |   | 3/2000  | Seo ............................. 362/252|
| 6,056,199 | A |   | 5/2000  | Wiklof et al. .......... 235/462.45      |
| 6,056,200 | A |   | 5/2000  | Dvorkis et al. ........ 235/472.01       |
| 6,112,981 | A | * | 9/2000  | McCall                                   |
| 6,247,645 | B1| * | 6/2001  | Harris et al. ................. 235/454  |

FOREIGN PATENT DOCUMENTS

| JP | 2-061782 | 3/1990 |
| JP | 5-205095 | 8/1993 |
| JP | 8-190061 | 7/1996 |

* cited by examiner

*Primary Examiner*—Diane I. Lee
(74) *Attorney, Agent, or Firm*—J. Bruce Schelkopf

(57) ABSTRACT

An optical reader includes a housing which may environmentally protect the optical path between a light source and a sensor array to reduce dust and debris interfering with transmission of light. The housing may further provide for alignment of the light path by positioning a focusing axis in alignment with the optical sensor array. The housing further acts as a light pipe to reflect transmitted light from a light source toward a focusing axis where the light may be reflected off of a document containing coded information back through the chamber defined by the housing to an optical sensor array. Point of sale devices incorporating an optical reader are also provided.

11 Claims, 4 Drawing Sheets

OPTICAL READER WITH COMBINED HOUSING AND LIGHT PIPE

This application is a continuation of application Ser. No. 09/237,143, filed Jan. 25, 1999, now U.S. Pat. No. 6,247,645.

FIELD OF THE INVENTION

The present invention relates to an optical reader in general and in particular to optical character readers for use with point of sale systems.

BACKGROUND OF THE INVENTION

Face to face retail sales transactions take place at the point of sale or what is commonly referred to as the checkout line or counter. It is at this location that the customer pays for the goods purchased, typically by either cash, check, charge or debit card.

To effectuate the sale, many retailers presently use electronic devices to facilitate and provide a record of transactions. Such a point of sale system may include a scanner for reading coded product price, a terminal for manual entry of transaction information and storage of currency, and a printer which may be used to produce a documentary record or journal for the business and a printed receipt for the customer. Check processing devices are also available to facilitate the transaction when a check is used for payment. Such check processing devices may include a Magnetic Ink Character Recognition ("MICR") reader for reading coded account information printed with magnetic ink which is commonly found on the front of checks. Optical character readers may also be provided for reading information encoded on a check.

As part of the check out procedure, the sales price of each item purchased is entered into the point of sale terminal. When paying by check, the customer then provides a check for the amount due to the cashier. The cashier inserts the check into the check processing device which reads the coded information such as MICR information, for further processing such as confirming sufficient fund availability or checking the information against a bad account list. A receipt is then provided from the printer to the customer.

An example of an optical reader apparatus which may be used for reading data from a check is U.S. Pat. No. 5,345,090. This reader apparatus illuminates the document with two light sources oriented adjacent a data window which is aligned along an optical axis which includes a mirror and aperature positioned to receive reflected light from the document.

It is also known to use optical fiber elements as light piping to allow the light source to be displaced from the document to be illuminated as described, for example, in U.S. Pat. No. 3,584,779. U.S. Pat. No. 3,726,998 discusses an alternate approach to light piping using a flat plate light pipe rather than optical fiber elements. On the receive end for reflected light, U.S. Pat. No. 4,495,412 describes the use of an optical waveguide circuit in a glass substrate to route light from a scanned line to a transducer where the length of the scanned line exceeds that of the transducer.

These known approaches to optical readers have limitations, particularly in the relatively compact and dirty environment of point of sale systems. Point of sale systems are typically located at the checkout counter where space is limited. Accordingly, printer and reader components are often packaged together to provide both a reduced footprint and reduced document handling requirements for a user. In such an environment, an optical reader preferably would provide for alignment, light routing and protection from environmental dirt and debris in a compact package. Another limitation is the cost of known optical readers which is, typically, higher than desired as a large number of point of sale devices, such as printers, are often used, making it desirable to provide a low cost reader for MICR characters.

SUMMARY OF THE INVENTION

In light of the above discussion, it is an object of the present invention to provide an optical reader which may be mounted in a point of sale device.

It is a further object of the present invention to provide an optical reader which may provide light routing and environmental protection.

It is another object of the present invention to provide an optical reader which may be produced at a reduced cost.

These and other objects are provided according to the present invention by an optical reader in which a housing is provided which may environmentally protect the optical path between light source and a sensor array to reduce dust and debris interfering with transmission of light. The housing may further provide for alignment of the light path by positioning a focusing axis in alignment with the optical sensor array. The housing further acts as a light pipe to reflect transmitted light from a light source toward a focusing axis where the light may be reflected off of a document containing coded information back through the chamber defined by the housing to an optical sensor array. Both the sensor and illumination capabilities of the optical reader of the present invention are thereby provided in a low-cost package having a small foot print and suitable for use in point of sale devices such as point of sale printer devices. The optical reader may be provided in a compact form which requires no critical optical tolerances and allows the use of standard circuit card assembly methods in fabrication of the optical reader.

In one embodiment of an optical reader of the present invention, an optical reader is provided which includes a base member with an optical sensor array connected to the base member. A housing is positioned over the optical sensor array and a light source is positioned in a chamber defined by the housing. The housing includes a reflecting surface portion positioned to receive light from the light source and direct the received light through the chamber towards a focusing axis at a first end of the housing. The housing may be connected to the base member to provide an enclosure protecting the optical sensor array and the light source from debris. Furthermore, the housing may be connected to the base member so as to position the focusing axis in alignment with the optical sensor array.

In a further embodiment of the optical reader of the present invention the housing includes a first portion extending up from the base member. The reflecting surface portion extends from an end of the first portion opposite the base member towards the focusing axis at an angle selected to receive light from the light source and direct the received light through the chamber towards the focusing axis. The reflecting surface portion of the housing may include an optically transmissive inner layer and a reflective cladding outer layer on a surface of the optically transmissive layer opposite the chamber.

In another embodiment of the optical reader of the present invention a light pipe is positioned in the chamber having a first end adjacent the optical sensor array and a second end adjacent the focusing axis so as to direct light reflected from a document positioned at the focusing axis to the optical sensor array. A view window is provided connected to the housing and positioned along the focusing axis. The base member may be provided as a circuit board and the light source and the optical sensor array may be electrically connected to the circuit board.

In another embodiment of the optical reader of the present invention, a second light source is provided positioned in the chamber and mounted on the circuit board and electrically connected to the circuit board. The housing includes a second portion extending up from the base member and a second reflecting surface portion extends from an end of the second portion opposite the base member towards the focusing axis at an angle selected to receive light from the second light source and direct the received light from the second light source through the chamber towards the focusing axis.

In a further aspect of the present invention, a point of sale device is provided including a housing and a document driver mounted in the housing to move a document inserted into the point of sale device along a document travel path. A magnetic reader is mounted in the housing and positioned along the document travel path to read MICR coded information from the document. An optical reader, such as those described above, is also mounted in the housing and positioned along the document travel path to read the MICR coded information from the document. The optical reader is mounted to position the focusing axis so that a portion of the document containing the MICR coded information passes through the focusing axis when the document is moved along the document travel path. The ability to redundantly read MICR coded information both magnetically and optically to improve performance in a point of sale environment is thereby provided.

DETAILED DESCRIPTION OF PREFERRED EMBODIMENTS

The optical reader of the present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
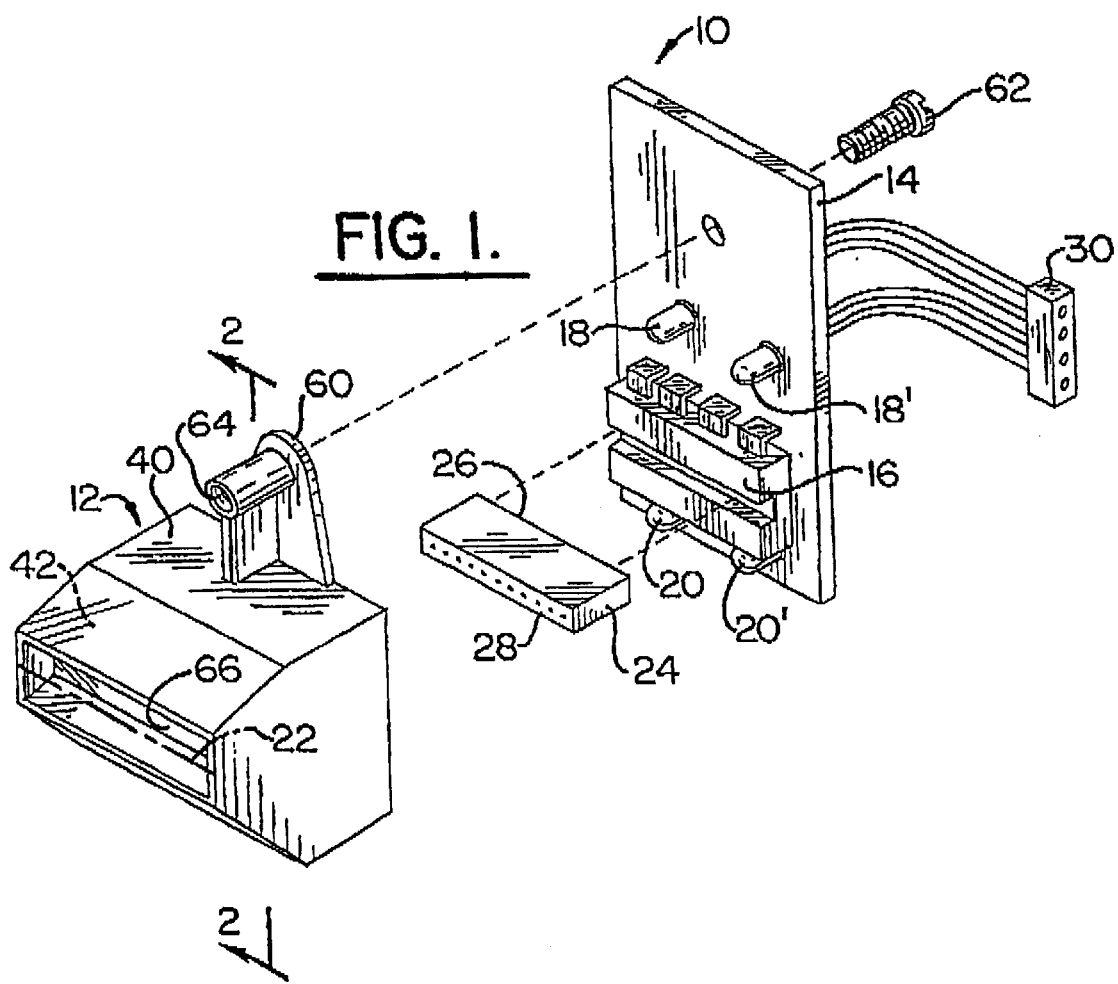
FIG. 1 is an exploded perspective view illustrating an embodiment of the optical reader of the present invention.
Figure 2:
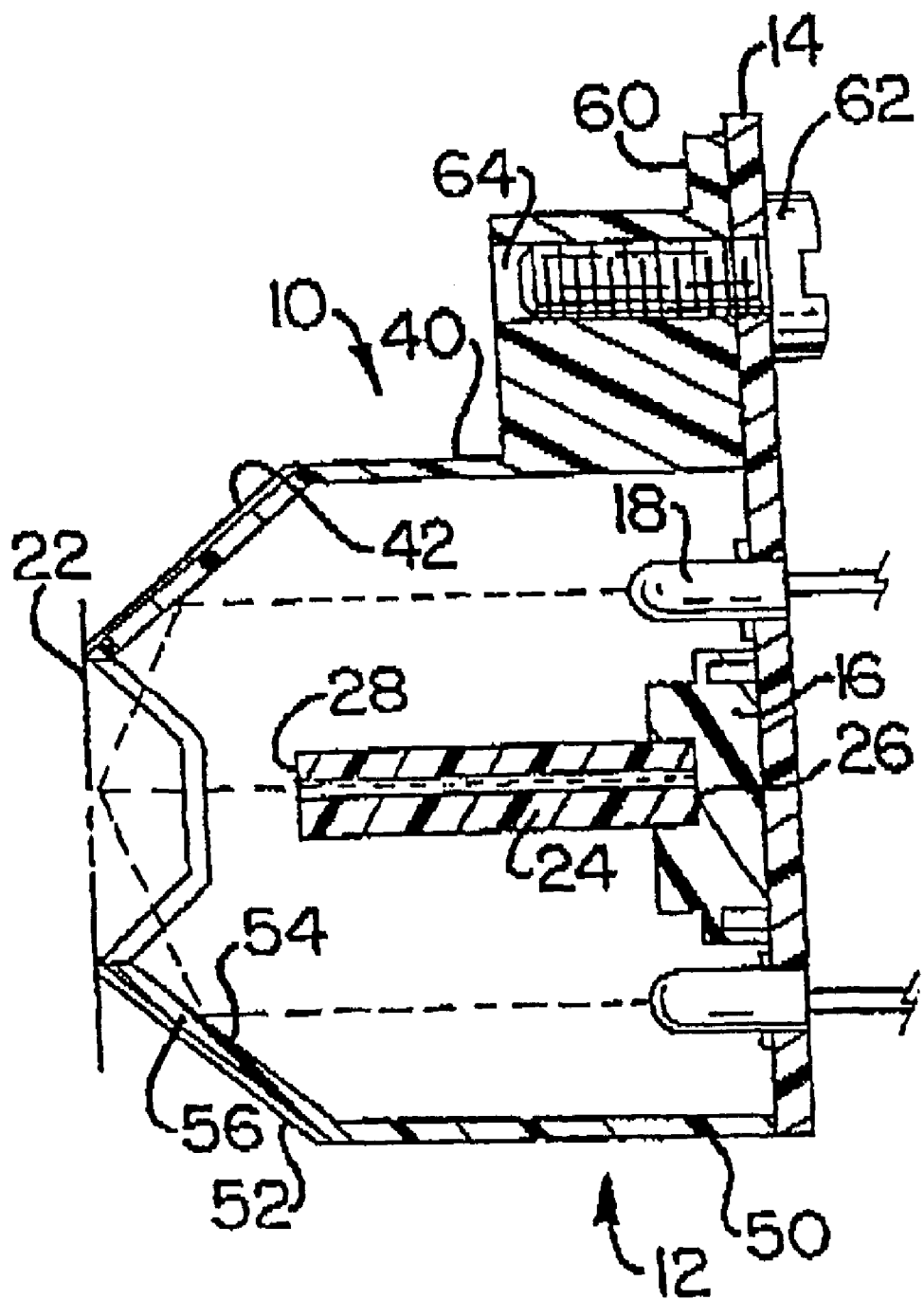
FIG. 2 is a cross-sectional view of the optical reader shown in FIG. 1.

Referring now to FIGS. 1 and 2, an embodiment of an optical reader according to the present invention is illustrated. The optical reader 10 includes a housing 12 connected to a base member 14. In the illustrated embodiment, the base member 14 is provided as a circuit board and an optical sensor array 16 is mounted on the circuit board 14. The optical sensor array 16 is a linear sensor array, such as the 102 by 1 linear sensor array available from Texas Instruments, Inc., and provides analog optical read data corresponding to the light incident upon the elements of the array.

Housing 12 is positioned over the optical sensor array 16 and is connected to the base member 14 to provide an enclosure protecting the optical sensor array 16 and light sources 18, 18', 20, 20' from debris. By positioning optical sensor array 16 and light sources 18, 18', 20, 20' in the chamber defined by housing 12 connected to base member 14, optical reader performance may be improved by reducing particulate dust and debris matter from obscuring the optical path for light emitted from light sources 18, 18', 20, and 20' and reflected off of a document positioned at a focusing axis 22 on a first end of housing 12 and back to optical sensor array 16. Thus, particulate dust and debris matter may be prevented from reducing the performance of the optical sensor array by scattering the light before it can be reflected and received. The chamber defined by housing 12 connected to base member 14 may be hollow, as illustrated in the Figures. Alternatively, the housing may be molded with optically transmissive material throughout the chamber with spaces provided for the various components contained within the chamber.

In addition to providing a protective enclosure, the housing 12 is connected to the base member 14 so as to position the focusing axis 22 in alignment with the optical sensor array 16.

The embodiment illustrated in FIGS. 1 and 2 further includes a light pipe 24 positioned in the chamber defined by the housing 12 and the base member 14. In the illustrated embodiment, the light pipe 24 is a SELFOC (available from Nippon Sheet Glass Company Ltd.) lens array. The light pipe 24 has a first end 26 adjacent the optical sensor array 16 and the second end 28 adjacent the focusing axis 22. Light pipe 24 focuses the image from a document positioned at the focusing axis 22 to the optical sensor array 16.

The electrical connections for the components in the illustrated embodiment of FIGS. 1 and 2 are provided by circuit board 14. The light sources 18, 18', 20, 20', which may be light emitting diodes (LEDs), which provide the source of light, as well as the optical sensor array 16, are each connected electrically to the circuit board 14 which, in turn, may include an attached electrical cable 30. Electrical cable 30 provides input connections for providing a power source to the optical sensor 10 and further for transmitting the optical read data from the optical sensor array 16 to a separate processing device which processes the optical information contained in the optical read data and identifies the associated characters printed on the document passing through the focusing axis 22.

In addition to providing a protective enclosure, the housing 12 acts as a light pipe to direct light received from light sources 18, 18', 20, 20' through the chamber formed by the housing 12 and the base member 14 towards the focusing axis 22. The light is directed by use of a reflecting surface portion 42, 52 of housing 12 as will now be further described for the illustrated embodiment.

As is best seen in the cross-sectional view of FIG. 2, the housing 12 includes a first portion 40 extending up from the base member 14. The housing structure further includes a reflecting surface portion 42.

The first portion 40 of the housing 12 extends up from the base member 14 and the reflecting surface portion 42, in turn, extends from an end of the first portion 40 opposite the base member 14 towards the focusing axis 22. The angle of the reflecting surface portion 42 is selected to enable the housing 12 to act as a light pipe directing light emitted by light sources 18, 18' towards the focusing axis 22. The angle is, therefore, selected to receive light from light sources 18, 18' and direct the received light through the chamber formed by the housing 12 and the base member 14 toward the focusing axis 22.

In the illustrated embodiment, the reflective characteristics of the reflecting surface portion 42 are provided by a multi-layer structure. A reflective cladding outer layer is provided on the housing 12, at least in the region of reflecting surface portion 42. The reflective cladding outer layer is preferably deposited or otherwise placed on an outer surface of an inner optically transmissive layer which defines a wall of the chamber formed by the housing 12 and the base member 14.

While the reflecting light pipe characteristics of the housing 12 have been described above with reference to only one side of the substantially symmetrical structure of the housing 12, receiving light from upper light sources 18, 18', as is illustrated in FIGS. 1 and 2, a second set of light sources 20, 20' may be provided on the opposite side of the chamber formed by the housing 12 and the base member 14. As was described previously for the first pair of light sources 18, 18', the housing 12 provides a light pipe for directing light from light sources 20, 20' towards the focusing axis 22. A first housing portion 50 extends up from the base member 14 and a second reflecting surface portion 52 extends therefrom towards the focusing axis 22 at an angle selected to receive light from the second pair of light sources 20, 20' and direct the received light through the chamber formed by the housing 12 and the base member 14 towards the focusing axis 22.

The second reflecting surface portion 52 preferably has a two-layer structure as was described with reference to the first reflecting surface 42 including an outer layer of a reflecting cladding material 54 and an inner layer of an optically transmissive material 56. The inner layer material, which may be molded to form the housing 12, is preferably a plastic with good optical transmission properties such as acrylic or optical grade polycarbonate.

The housing 12 may include additional features as illustrated in FIGS. 1 and 2. In the embodiment shown in the FIGS. 1 and 2, a mounting tab 60 is positioned on one end of the housing 12 and provides a means for connecting the housing 12 to the base member 14. The housing 12 may be connected to the base member 14 by a self tapping screw 62 which is inserted into a channel 64 of the mounting tab 60.

Furthermore, the end of the housing 12 defining the focusing axis 22 may include an optically transmissive view window 66 which allows light reflected from reflecting surfaces 42, 52 to pass out of the chamber defined by the housing 12 and the base member 14 to strike a document containing coded information passing through the focusing axis 22. Light is then reflected from the document back through the view window 66 to be directed by the light pipe 24 to the optical sensor array 16.

It is to be understood, however, that the housing 12 may instead be provided with an open portion rather than a view window 66 providing for passage of light to and from a document to be read. It is further to be understood that, while the light directing characteristics of the present invention have been generally described herein with reference to a focusing axis 22, the light may be only generally directed towards the focusing axis 22 as the document to be illuminated will define a focusing plane along the focusing axis 22 having a finite width. The focusing plane width tangent to the focusing axis 22 is preferably selected to optimize the amount of light from light sources 18, 18', 20, 20' which is reflected back to the optical sensor 16 by a document passing through the focusing axis 22 to increase the likelihood of successfully reading information from the document.

Figure 3:
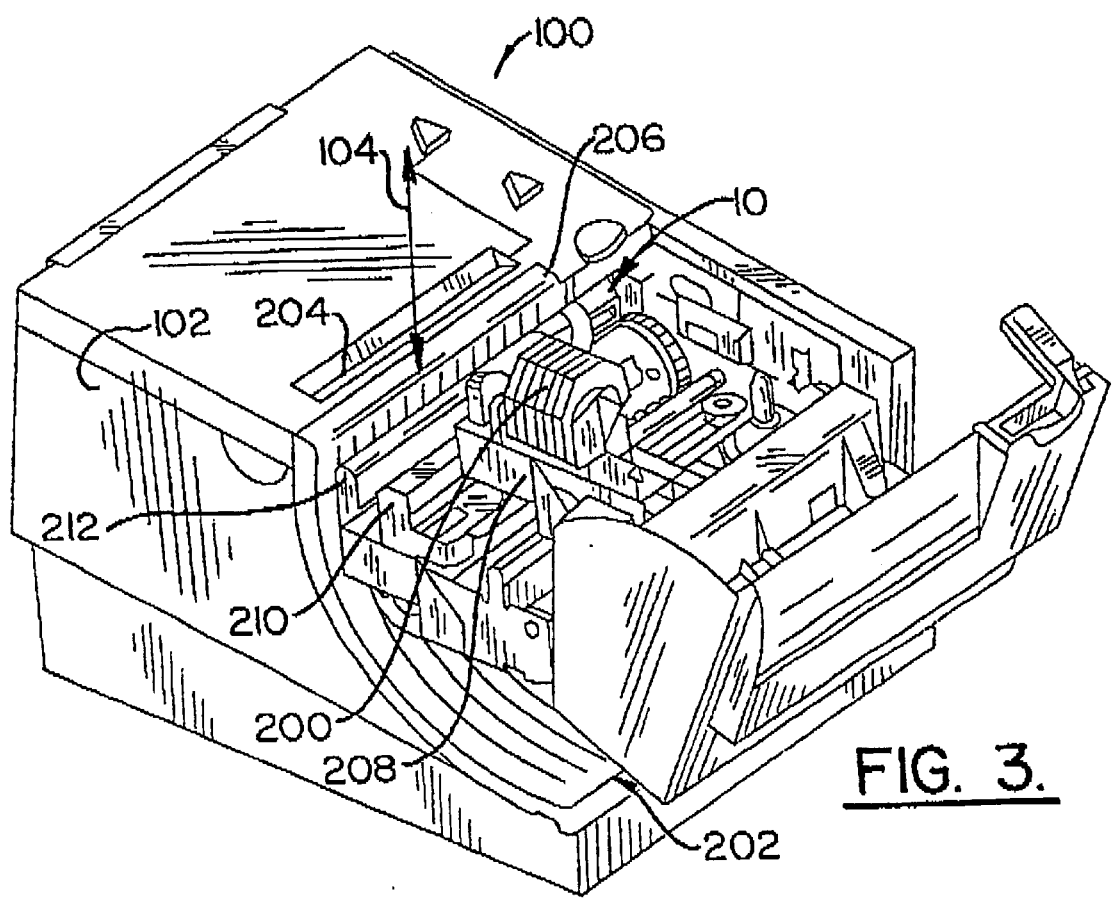
FIG. 3 is a perspective view illustrating an embodiment of the optical reader of the present invention positioned in a point of sale printer device.

The present invention may also be provided as a point of sale device such as the point of sale printer device which is illustrated in FIG. 3. As shown in the embodiment of FIG. 3, the point of sale printer device 100 includes a housing 102 which contains the various components of the point of sale printer device 100. The point of sale printer device 100 further includes a document driver mounted in the housing 102 to move a document inserted into the point of sale printer device 100 along a document travel path illustrated by axis 104.

An optical reader 10 is mounted in the housing 102 and positioned along the document travel path 104 to read coded information from a document passed through the point of sale printer 100. More particularly, the point of sale printer device 100 illustrated in FIG. 3 is suited for use in check processing and the optical reader 10 is mounted in the housing 102 to read the MICR coded information from the document. The optical reader 10 is mounted in the housing 102 to position the focusing axis 22 so that a portion of the document passing along document path 104 containing the MICR coded information passes through the focusing axis 22 when the document is moved along the document travel path 104. A magnetic reader may also be mounted in the housing 102 and positioned along the document travel path 104 to read coded information from a document. By providing both a magnetic reader and an optical reader according to the present invention, the MICR coded information typically provided on checks may be read using both sensors to provide for improved reliability of character recognition for processing point of sale transactions.

Referring again to FIG. 3, various aspects of the point of sale printer device 100 will now be further described. Such a point of sale printer device 100 is used in facilitating sales transactions at locations such as a check out counter where a customer makes payment for merchandise. As shown in FIG. 3, a print head 200 as well as optical reader 10 are contained within housing 102. Housing 102 further includes a document insertion region 202. Documents inserted into insertion region 202 are moved, using known document handling mechanisms which will not be described further herein, to allow documents inserted into the printer to be moved along document travel path 104 (represented figuratively by a directional arrow) past print head 200 and optical reader 10. Optical reader 10 is mounted at a first position in document travel path 104. Print head 200, as illustrated, is laterally offset from optical reader 10.

As shown in FIG. 3, housing 102 includes additional document insertion region 204 particularly adapted for use with paper rolls such as those used for customer receipts or journal records. Document insertion region 202 is adapted to sheet feed documents such as forms or checks and includes alignment edge 206 for positioning documents fed through document insertion region 202 laterally with respect to document travel path 104. Regardless of whether documents are inserted in region 202 or 204, the documents are fed along document travel path 104 past print head 200. Documents inserted in document insertion region 202 and aligned with respect to alignment edge 206 are fed along document travel path 104 past optical reader 10.

Print head 200 is mounted on print head carrier 208 which is movably mounted on a transport guide mechanism 210 allowing movement of print head 200 across a document for printing. Print head 200 is located adjacent platen 212 and spaced from platen 212 a sufficient distance to allow documents inserted into the printer to pass between print head 200 and platen 212 along document travel path 104. It is to be understood that platen 212 may be a rigid member serving to locate the document to be printed by print head 200 and to serve as a strike surface for a dot matrix printer but it is known that platen 212 may provide for location of the document for printing in different manners for different types of print heads such as may be found in a laser printer.

Print head 200 may first be used to generate customer receipts and a journal record of the items sold on paper fed either through document insertion region 202 or on paper fed from a spool in insertion regions 204. Payment is then made by the customer for the costs of the transaction.

Figure 4:
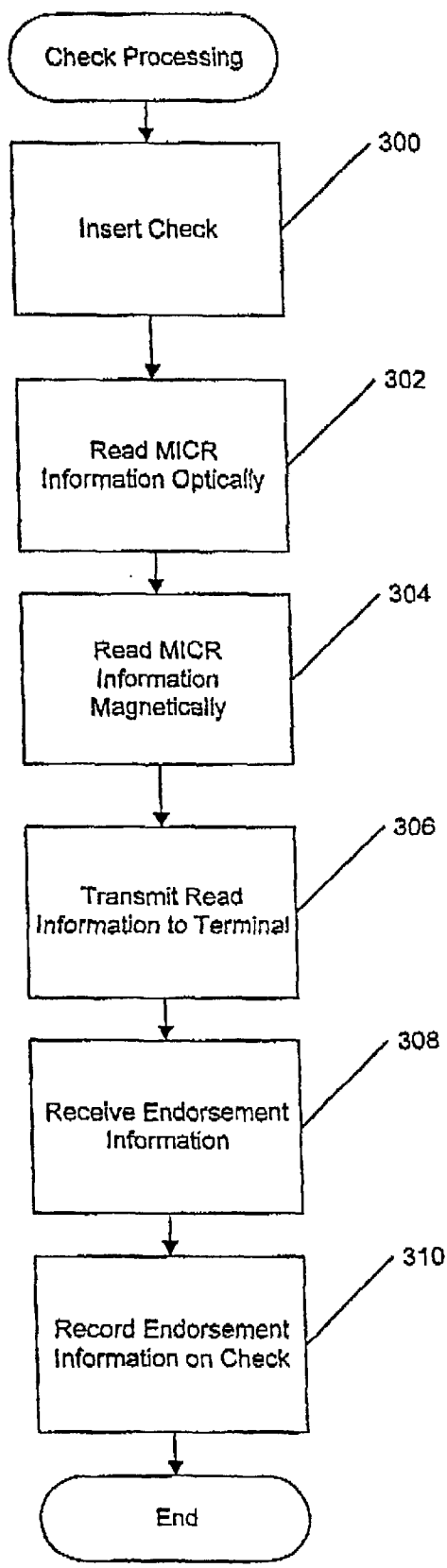
FIG. 4 is a flow chart illustrating operations for check processing using an embodiment of a point of sale printer device according to the present invention.

Operations for processing a check payment during a sales transaction utilizing the present invention are illustrated in FIG. 4. The check provided by the customer is inserted into the printer in insertion region 202, aligned on alignment edge 206 and placed face down at block 300. The check is moved past optical reader 10 to read the MICR information at block 302. It may also be moved past a magnetic reader to read the same MICR information magnetically (block 304).

During read block 302, the check may be held in the focusing axis 22 of the optical reader 10 by the structures defining document travel path 104 or other means for positioning the document adjacent optical reader 10. Both the magnetically and optically read coded information is then passed along to a terminal or other controller at block 306. Character recognition of the MICR information may be performed in real time by a controller. If this controller is located in the printer, the information read by optical reader 10 may be transmitted by the printer of the present invention in the form of alphanumeric characters representing information such as the account number the check is to be drawn against. Real time character recognition also provides for error detection to initiate rereads.

The check is then cleared, either by remote access to the bank computer to confirm a sufficient balance and debiting the account for the amount of the transaction or by checking the account number against a data base, for example of known bad checks, maintained at the store using techniques known to those of ordinary skill in the art. After the check is cleared, print data, typically endorsement information, is received by the printer at block 308. The check is then moved along document travel path 104 and print head 200 prints the endorsement information on the back of the check at block 310. The check is then removed from the point of sale printer device 100. Alternatively, the point of sale printer device 100 of the present invention may also be used to print other known information on the front of the check such as payee, date and amount so that the customer need only provide a signature on the check.

While the invention has been described with specificity above with reference to the dot matrix printer and optical reader illustrated in the drawings, it is to be understood that the present invention is likewise directed to other types of printers and to other methods presently used or which may in the future be used for encoding information on transaction documents such as checks.

Operations related to use of both a magnetic and an optical reader will now be further described according to an embodiment of the present invention. As described above, a check is inserted into the point of sale printer device 100 and awaits a command from a terminal to start the MICR reading process. Once this command is received, the check is fed past a magnet that magnetizes the magnetic ink particles embedded in the MICR characters. This provides a magnetic field that the magnetic read head should be able to detect. The check then traverses past the optical reader 10 where slice data is recorded for each character. This data is stored, for example, in a Random Access Memory (RAM) and may be operated upon after the read process is completed. A magnetic read head follows and produces an analog signal representing the wave forms for each character. This signal is sent to an input of an A/D converter (analog to digital) which provides a digital representation of the analog MICR signal. Like the optical data, the digital data from the magnetic read head is stored in RAM for further processing.

The primary decode is preferably from the magnetic sensing data. If the magnetic decoding process cannot properly decode one or more characters, then an optical decode is enabled using the data from optical reader 10. The optical decoding can be used to identify those MICR characters that could not be identified based on the magnetic decoding. If the optical decoding removes all the read errors from the MICR character set of the check, the data may then be passed to the terminal for further processing. If errors still exist, the process may be repeated one or more times until all of the MICR characters are read successfully. If the subsequent pass(es) still produce errors in reading some of the MICR characters, an error message may be sent to the terminal.

If a successful read is obtained by the magnetic reader, optical decoding may still be invoked to be used as part of a "Scoring" process for determining the confidence level of character prediction. This may result in a higher degree of accuracy in the prediction process and fewer substitution errors (misidentifying a character). The optical decoding may, therefore, be used in a variety of ways including: 1) verify the characters read magnetically; 2) provide backup data for those characters that could not be read magnetically; 3) provide an entire character set worth of data in a high magnetic/electric noise field environment, and; 4) factored in the "Scoring" process when decoding a character.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An optical reader comprising:
   a base member;
   an optical sensor array connected to said base member;
   a housing positioned over the optical sensor array and defining a chamber in which the optical sensor array is positioned;
   a light source positioned in the chamber defined by the housing;
   wherein the housing includes a reflecting surface portion positioned to receive light from the light source and direct the received light through the chamber towards a focusing axis at a first end of the housing; and
   wherein the reflecting surface portion of the housing includes an optically transmissive inner layer and a reflective cladding outer layer on a surface of the optically transmissive layer opposite the chamber.

2. An optical reader according to claim 1 wherein the housing is connected to the base member to provide an enclosure protecting the optical sensor array and the light source from debris.

3. An optical reader according to claim 2 wherein the housing is connected to the base member so as to position the focusing axis in alignment with the optical sensor array.

4. An optical reader according to claim 3 wherein the housing includes a first portion extending up from the base member and wherein the reflecting surface portion extends from an end of the first portion opposite the base member towards the focusing axis at an angle selected to receive light from the light source and direct the received light through the chamber towards the focusing axis.

5. An optical reader according to claim 1 wherein the housing is connected to the base member so as to position the focusing axis in alignment with the optical sensor array.

6. An optical reader according to claim 1 wherein the housing includes a first portion extending up from the base member and wherein the reflecting surface portion extends from an end of the first portion opposite the base member towards the focusing axis at an angle selected to receive light from the light source and direct the received light through the chamber towards the focusing axis.

7. An optical reader according to claim 1 wherein the base member is a circuit board and wherein the light source and the optical sensor array are electrically connected to the circuit board and wherein the optical sensor is mounted on the circuit board.

8. A point of sale device comprising:
   a housing;
   a document driver mounted in the housing to move a document inserted into the point of sale device along a document travel path;
   a magnetic reader mounted in the housing and positioned along the document travel path to read MICR coded information from the document;
   an optical reader mounted in the housing and positioned along the document travel path to read the MICR coded information from the document;
   wherein the optical reader comprises:
      a base member;
      an optical sensor array connected to said base member;
      a sensor housing positioned over the optical sensor array and defining a chamber in which the optical sensor array is positioned;
      a light source positioned in the chamber defined by the sensor housing;
      wherein the sensor housing includes a reflecting surface portion positioned to receive light from the light source and direct the received light through the chamber towards a focusing axis at a first end of the sensor housing; and
      wherein the optical reader is mounted to position the focusing axis so that a portion of the document containing the MICR coded information passes through the focusing axis when the document is moved along the document travel path.

9. A point of sale device according to claim 8 wherein the sensor housing is connected to the base member to provide an enclosure protecting the optical sensor array and the light source from debris.

10. A point of sale device according to claim 8 wherein the sensor housing is connected to the base member so as to position the focusing axis in alignment with the optical sensor array.

11. A point of sale device according to claim 8 wherein the sensor housing includes a first portion extending up from the base member and wherein the reflecting surface portion extends from an end of the first portion opposite the base member towards the focusing axis at an angle selected to receive light from the light source and direct the received light through the chamber towards the focusing axis.

* * * * *